(12) United States Patent
Kirkpatrick et al.

(10) Patent No.: US 7,103,871 B1
(45) Date of Patent: Sep. 5, 2006

(54) METHOD FOR RAPID APPLICATION LIFE CYCLE CHANGE REQUESTS

(75) Inventors: Mark A. Kirkpatrick, Conyers, GA (US); Darin J. Morrow, Acworth, GA (US); Nichole Anderson, Duluth, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 570 days.

(21) Appl. No.: 10/114,950

(22) Filed: Apr. 4, 2002

(51) Int. Cl.
*G06F 9/44* (2006.01)
(52) U.S. Cl. .................................... 717/102
(58) Field of Classification Search ........ 717/101–103, 717/120–123; 705/7–9, 500
See application file for complete search history.

(56) References Cited

U.S. PATENT DOCUMENTS 6,256,773 B1 * 7/2001 Bowman-Amuah ......... 717/121
2003/0009740 A1 * 1/2003 Lan ............................ 717/102

OTHER PUBLICATIONS

Tony Garland and Steven C. McConnell, "Detailed Change Control Procedure," [online], accessed Mar. 2, 2005, Retrieved from Internet <URL: http://www.construx.com/survivalguided/detailedchangeproc.htm>, 8 pages.*

David Hollingsworth, "The Workflow Reference Model," 1995, The Workflow Mangement Coalition, Issue 1.1, pp. 1-55.*

Michael R. McGuire, "16. Monitoring and Control of a Project," 2000 [online], accessed Mar. 2, 2005, Retrieved from Internet <URL: http://www.uprforum.com/Chap16.htm>, 8 pages.*

"wftk—Using scenarios: Open-source software project," 2000 [online], accessed Mar. 3, 2005, Retrieved from Internet <URL: http://www.vivtek.com/wftk/usage/openproj.html>, 7 pages.*

* cited by examiner

*Primary Examiner*—Tuan Dam
*Assistant Examiner*—Eric B. Kiss
(74) *Attorney, Agent, or Firm*—Withers & Keys, LLC

(57) ABSTRACT

A project management process for implementing change requests to a computer application proceeds in stages. In an assessment stage, a project manager determines whether the change request falls within the scope of the computer application. If the project manager deems the change request acceptable, the change request is forwarded to a development lead, a quality assurance (QA) lead, and a documentation lead for approval. The development lead determines whether the change request is technically feasible and if there are any technical issues. The QA lead determines what testing requirements must be met to implement the change request. The documentation lead determines what documentation requirements must be met to implement the change request. If the change request is approved by the development lead, the QA lead and the documentation lead, the change request is implemented. If the change request is not approved, it is rejected or placed on hold.

14 Claims, 2 Drawing Sheets

METHOD FOR RAPID APPLICATION LIFE CYCLE CHANGE REQUESTS

BACKGROUND

1. Field of the Invention

The present invention relates generally to project management of computer software development. More specifically, the present invention relates to an efficient procedure for processing a change request by viewing the entire life cycle of the change request.

2. Background of the Invention

Traditional software development attempts to provide software that meets customers' requirements. These requirements are often general in nature and are generated from information gathered by groups of project managers or project architects from groups of customers, often through third persons. A problem with such general requirements is that they do not accurately reflect each individual customer's needs. As a result, when a software application meeting the general requirements is delivered and installed, it often does not fully satisfy a particular customer's requirements.

As a result, customers often request changes to the software application, reject the software application delivery or take some other adverse action. In response to the customer's comments and actions, the software development and installation process must be repeated to meet new requirements. This iterative nature of traditional software development makes conventional software development time-consuming and costly.

In web-based software development efforts, the foregoing problems associated with delivery of software applications that do not adhere to customer requirements or do not meet customer expectations are magnified. This is because there are usually many more customers of the software, they are likely to be more diverse and to have had less input into the initial design of the software. Consequently, the initial requirements gathering is even less accurate than with traditional software development. Thus, designers and developers are often inundated with numerous change requests for modification to the software to meet specific customer requirements. Consequently, the process of responding to the change requests needs to be optimized.

SUMMARY OF THE INVENTION

The present invention addresses the foregoing problems in the art by providing a method for managing change requests to software applications. The method eliminates inefficiencies encountered in conventional software development efforts by considering the life cycle of change requests, rather than just developing software to implement the requested change. The method formally assigns particular tasks to particular individuals responsible for the life cycle of a change request. These individuals are given approval authority for particular aspects of the life cycle of the change request. When a particular aspect is not approved, these individuals can negotiate with one another to attempt to overcome the impediment to approval.

In one embodiment, the change request is submitted to an approval chain. The approval chain comprises people that analyze the change request and determine whether the change request should proceed to the next person in the chain. For example, an approval chain can comprise a project manager that performs an impact analysis of the change request. If the impact is determined to not be too great, the change request is forwarded to a development lead. The development lead performs a technical analysis on the change request. If the change request is technically feasible, the change request is forwarded to a quality assurance lead to determine if there are any quality assurance issues that need to be resolved. If all quality assurance issues can be resolved, the change request is forwarded to a documentation lead to determine whether there are any documentation issues that need to be resolved. If all documentation issues can be resolved, the change request is then forwarded to appropriate persons for incorporation into the computer application. If any person in the approval chain determines that the change request should not be forward to the next person in the chain, the change request can be stored for further analysis.

In one embodiment, the present invention is a method for processing change requests to a computer application. The method includes the steps of accepting the change request and forwarding the change request to a project manager. Upon gaining approval from the project manager to incorporate the change request, the change request is forwarded to a development lead. If the change request is technically feasible, it is forwarded to a quality assurance (QA) lead and to a documentation lead. According to the method, the QA lead and documentation lead determine whether there are any QA issues or documentation issues, respectively. The method includes the step of incorporating the change request in the application if both the QA issues and the documentation issues, if any, can be resolved.

DETAILED DESCRIPTION OF THE INVENTION

Figure 1:
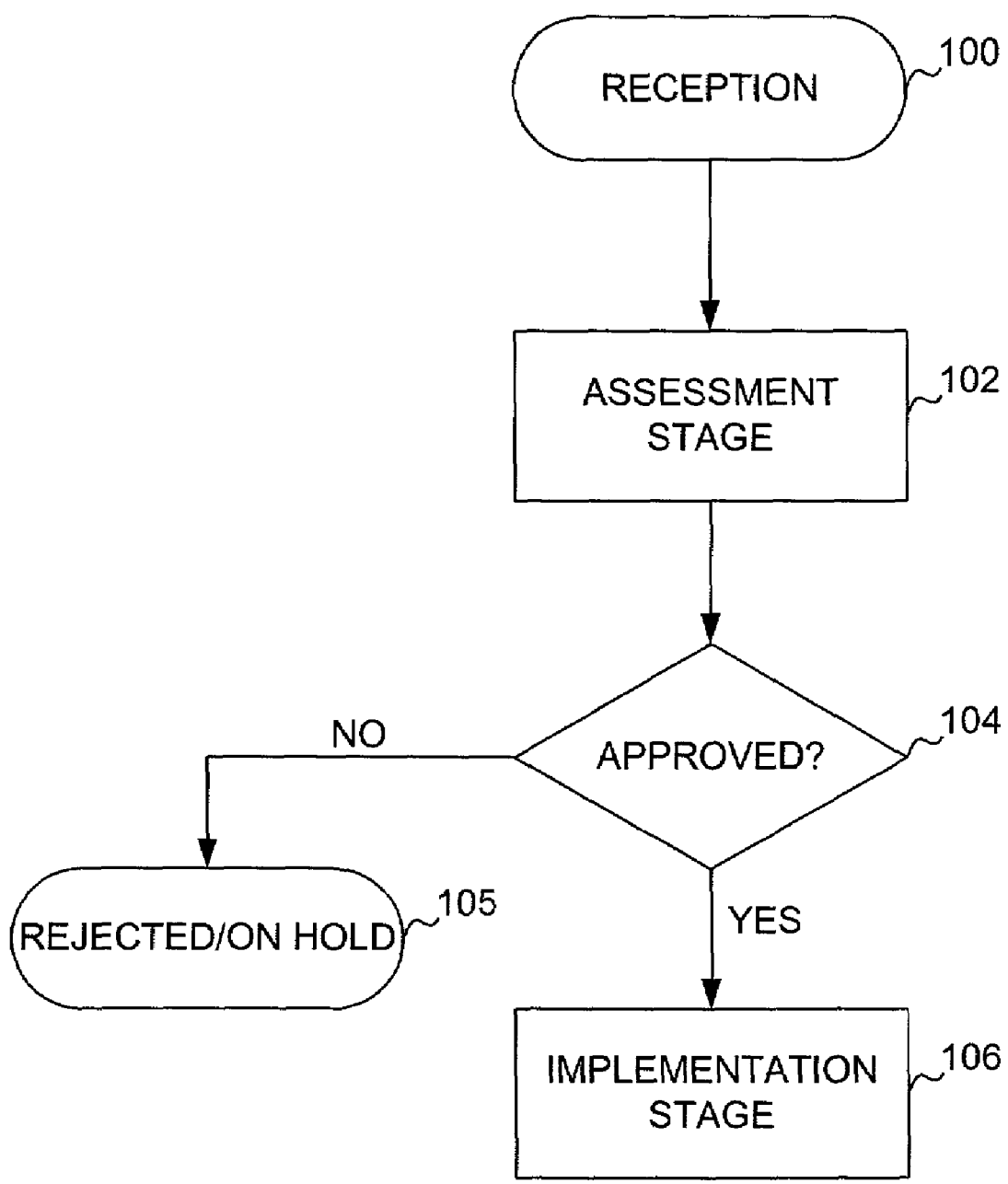
FIG. 1 is a flowchart illustrating three stages of a method for processing a change request for a change to a computer application.

FIG. 1 is a flowchart illustrating three stages of a method for processing a change request for a change to a computer application, according to an embodiment of present invention. A change request is received at step 100. Stage 102 is an assessment stage in which a project manager assesses the change request. In essence, the project manager acts as a gatekeeper for change requests to the computer application. In assessment stage 102, the project manger makes an initial evaluation of the change request to determine if the change request is appropriate for the computer application. For example, many change requests are actually requests for enhancements that may be beyond the scope of the current implementation of the application. The project manager can make this determination. Change requests for enhancements deemed to be beyond the scope of the current implementation of the computer application are delayed for consideration until a future release of the computer application. Alternatively, the project manager can discard the change request as beyond the scope of the computer application.

According to one embodiment of the present invention, the project manager allows actual product changes and some enhancements to the computer application to be forwarded to a development lead, a quality assurance lead and a document lead for analysis and approval. If the project manager deems the change request appropriate for the product, the change request enters an approval stage 104. In approval stage 104, the project manager confers with the development, QA and documentation leads. The development lead, the QA lead and the documentation lead present their estimates of schedule impact. If a consensus is reached by the group, the change request is approved. Alternatively the change request may be rejected or put on hold, as shown in step 105. Note that in one embodiment of the present invention, the project manager can override the decisions of the development, QA and documentation leads.

The development lead is preferably a person familiar with the technical aspects of the computer application, including the source code and the software architecture of the computer application. The development lead evaluates whether the modifications to the computer application necessary to incorporate the change request in the computer application are technically feasible, and, if so, the amount of development work required to incorporate the change in the computer application.

If the requested change can be incorporated into the computer application, the change request is forwarded to a quality assurance (QA) lead and to a documentation lead. The quality assurance lead is preferably a person familiar with computer application testing paradigms and methodologies used to ensure the computer application reliably operates as designed. For example, the QA lead evaluates the impact of the change request to a quality assurance plan.

The documentation lead is preferably a person familiar with requirements for documenting computer applications and changes thereto. For example, the documentation lead evaluates the scope of the modifications that will be required to existing documentation if the change requested by the change requests is incorporated into the computer application.

After the change is approved, it is implemented in an implementation stage 106. During the implementation stage, the QA and documentation leads provide details to the appropriate resources (e.g., software developers, programmers, etc.) so that documentation can be updated as required and appropriate testing can be developed and executed.

Figure 2:
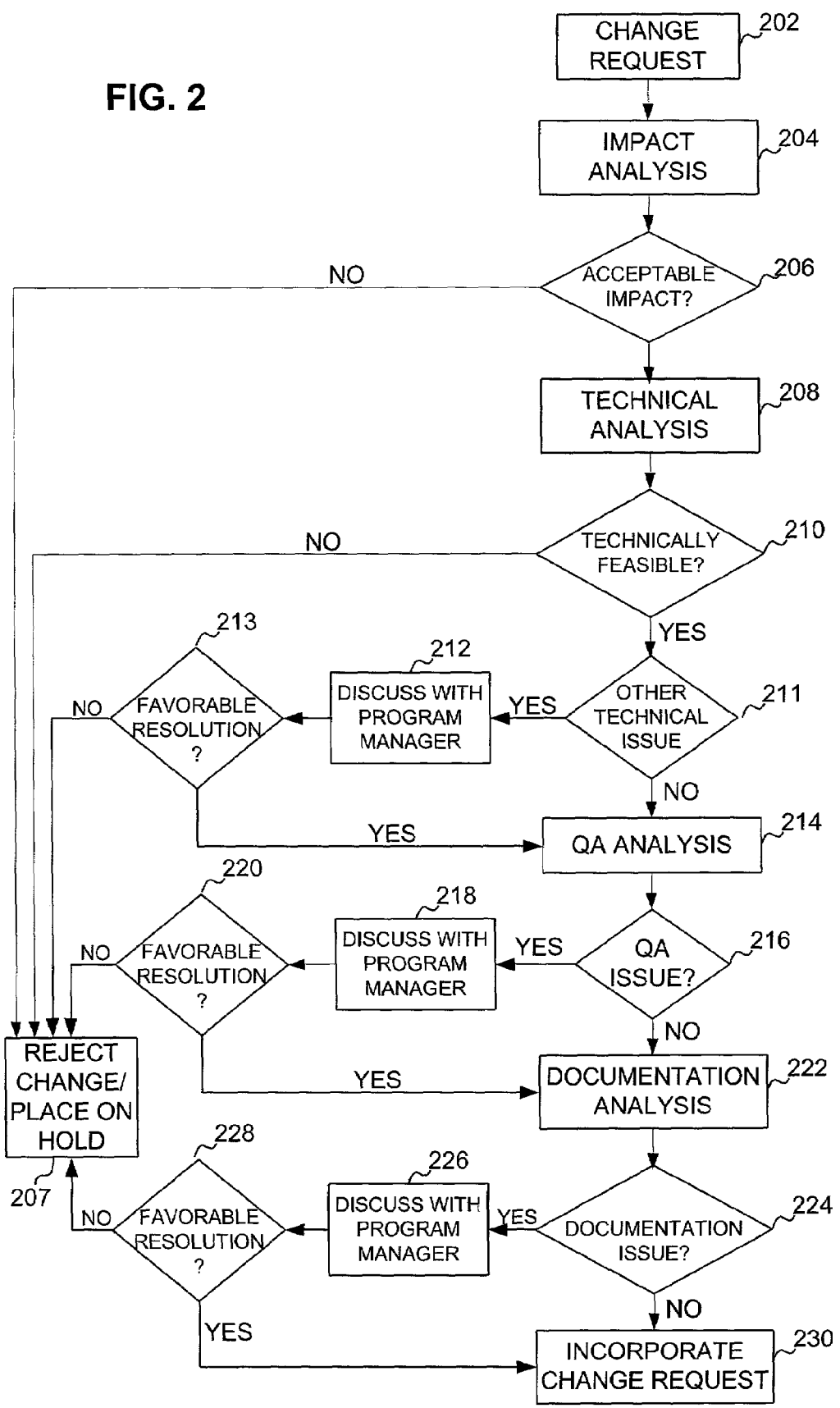
FIG. 2 is a flowchart of a process for rapidly implementing a change request by considering the entire life cycle of the change request according to an embodiment of the present invention

FIG. 2 is a flowchart of a method for rapidly implementing a change request by considering the entire lifecycle of the change request according to an embodiment of the present invention. In step 202, a change request to a computer application is received. In general, a customer generates the change request, and forwards it to an appropriate authority for approval and implementation. In step 204, a project manager reviews the change request and determines its impact on the computer application that the change request affects. Generally, the program manager's analysis focuses on whether the change request has a significant impact on the application or not. For example, a change request having a significant impact on the computer application is one that significantly changes the way the application works. From this analysis, the program manager can determine whether the change should be made. For example, change requests having significant impacts are generally not incorporated, but are held for a subsequent release of the computer application.

The program manager's viewpoint is from a business perspective. This is because the program manager understands the business implications of the change for the particular software application to which the change request is directed. For example, the change request may be beyond the scope of the current version of the computer application.

If the program manager determines the impact required by the change request is acceptable in step 206, the process continues in step 208.

In step 208, a development lead analyses the change request from a technical perspective. In step 210, the development lead determines whether the change is technically feasible or not. If the change is not technically feasible, the change request is rejected or placed on hold in step 207.

If the change request is technically feasible, the process continues in step 211, where the development lead determines if there are other problems of a technical nature with the change request. For example, other technical problems can include a longer development time required to incorporate the change required by the change request in the computer application than the project manager allotted. Another example of such other technical problems is that the change required by the change request may cost more to incorporate in the computer application than budgeted or than warranted (cost/benefit analysis). If no such problems exist, the process continues with QA analysis in step 214.

If there is a problem with modifying the computer application to address the change request other than it being not technically feasible, the process continues in step 212. In step 212, the development lead and project manager discuss the technical issues. If the problems cannot be favorably resolved, the change request is rejected or placed on hold in step 207. If the problem or problems can be resolved in step 213, the method continues in step 214 with quality assurance analysis.

Quality assurance analysis is performed by a QA lead. The QA lead determines testing requirements. This determination includes considerations of cost, manpower, duration, facilities and other testing requirements.

If there are any QA issues determined in step 216, the method continues in step 218. In step 218, the QA lead and the program manager discuss the issues to try to resolve them. Problems can be resolved in a variety of ways. For example, the program manager can decide that certain tests are not required, or that the testing can take additional time, if required. The program manager can also overrule the QA lead by deciding that no testing needs to be done. If the QA issues cannot be favorably resolved in step 220, the process continues in step 207 where the change request is rejected or placed on hold.

If there are no issues arising from the QA analysis or any QA issues are favorably resolved or vetoed, the method continues in step 222 with a documentation analysis. In the documentation analysis, a documentation lead determines what, if any, documentation modifications or additions are required to document the implementation of the change request. Documentation issues include documentation being more voluminous or costly than expected, and the documentation taking longer to produce than allotted by the program manager.

If there are any documentation issues identified in step 224, the method continues in step 226. In step 226, the documentation lead and the program manager discuss any documentation issues to try to resolve them. Problems can be favorably resolved in a variety of ways. For example, the program manager can decide that certain documentation is not required, or that the production of documentation can take additional time, if required. The program manager can also effectively veto the documentation lead by determining that no documentation is required. If the documentation issues cannot be favorably resolved in step 228, the method continues in step 207 where in the change request is rejected or placed on hold. If the document issues are resolved or if there were no documentation issues, then the method continues in step 230 with incorporation of the change request.

The method described above proceeds with the QA analysis prior to the documentation analysis. In another embodiment of the present invention, the documentation analysis is performed prior to the QA analysis. In yet another embodiment of the present invention, the QA analysis and documentation analysis are performed substantially concurrently.

The preceding method reduces the inefficiencies associated with implementing change requests in conventional systems by formalizing responsibilities and authorization power of key persons in the life cycle of the change request from submission to implementation. The procedure provides for checks and balances through negotiations between the different levels of these key persons. However, with the exception of technical unfeasibility, the present invention provides the program manager with a veto power over other levels in the life cycle management of the change request.

The preceding method can also be run and/or controlled using a computer to perform the tasks and scheduling described herein. Such a computer can be any computer that can be programmed to perform and monitor the tasks and scheduling described herein, including personal computers, mainframes and other computers. It would be apparent to those skilled in the art how to program such a computer to carry out the functions described herein. In one embodiment, required discussions are carried out between required project leads, development leads; QA leads using electronic mail and other electronic connectivity over a computer network. Further forwarding of the change request can be over a computer network, for example, by using electronic mail, network messaging or any other computer network connectivity.

For example, in one embodiment of the present invention, the computer is configured with computer software that receives a change request and forwards the change request to a project manager to perform an impact analysis. If the project manager determines that the change request imposes too great an impact, the computer can store the change request for further analysis. If the project manager determines that the change request does not impose too great an impact on the computer application, the computer forwards the change request to a development lead for technical analysis. If the development lead determines that the change request is not technically feasible, the computer can store the change request for further analysis. If the development lead determines that the change request is technically feasible, the computer forwards the change request to a quality assurance lead to determine if there are any quality assurance issues. If the quality assurance lead determines that there are quality assurance issues, the computer can store the change request for further analysis. If the quality assurance lead determines there are no quality assurance issues, the computer forwards the change request to a documentation lead to determine if there are any documentation issues. If the documentation lead determines that there are documentation issues, the computer can store the change request for further analysis. If the documentation lead determines that there are no documentation issues, the computer forwards the change request to the appropriate person or persons for incorporation of the change request into the computer application.

The computer can forward the change request in a number of manners including, for example, by posting to a predetermined change request area, by email, by popping windows containing the change request information and authorization requests to a particular person or any manner of forwarding the change request.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for processing change requests to a computer application, said method comprising the steps of:
    (a) receiving an electronic message by a computer containing a change request with one or more application features and system requirements;
    (b) electronically forwarding the change request to a project manager responsible for the computer application;
    (c) conducting an impact analysis by comparing one or more application features and system requirements requested in the change request to the existing computer application to determine the degree that the one or more application features and system requirements changes the manner in which the computer application functions, wherein the project manager electronically annotates a first approval status on the change request;
    (d) electronically forwarding the change request to a development lead, if the first approval status is positive, for a determination of whether the development time exceeds a threshold and for a cost benefit analysis of the one or more application features and system requirements designated in the change request, wherein the development lead electronically annotates a second approval status on the change request document with the second approval status being positive when the development time does not exceed the threshold and when the benefits outweigh the costs;
    (e) electronically forwarding the change request to a quality assurance lead, if the second approval status is positive, for an analysis of the one or more application features and system requirements requested in the change request in regards to required testing resources including but not limited to funding, manpower, time, and facility utilization, wherein the quality assurance lead electronically annotates a third approval status on the change request and wherein the third approval status is positive when the required testing resources do not create an issue or if the required testing resources do create an issue, a determination is made to eliminate at least a portion of the testing to reduce the required testing resources;

(f) electronically forwarding the change request to a documentation lead, if the third approval status is positive, for an analysis of the one or more application features and system requirements requested in the change request in regards to documentation requirements comprising funding and time wherein the documentation lead annotates a fourth approval status on the change request document and wherein the fourth approval status is positive when the documentation requirements do not create an issue or if the documentation requirements do create an issue, a determination is made to eliminate at least a portion of the documentation requirements;

(g) incorporating one or more additional sets of computer code into the computer application implementing the one or more application features and system requirements requested in the change request if the fourth approval status on the change request document is positive.

2. The method recited in claim 1, further comprising the steps of:

determining whether there are other technical issues that arise to incorporate the change request in the computer application; and incorporating the change request only if there are no other technical issues.

3. The method recited in claim 1, further comprising the steps of:

resolving any quality assurance issues that arise while incorporating the change request in the computer application; and incorporating the change request after all such quality assurance issues are resolved.

4. The method recited in claim 3, further comprising the steps of:

electronically scheduling a conversation between the project manager and the documentation lead to discuss and resolve all documentation issues that arise while incorporating the change request in the computer application; and incorporating the change request only if there are no such documentation issues or all such documentation issues are favorably resolved.

5. A method for processing change requests to a computer application, said method comprising the steps of:

(a) receiving an electronic message by a computer containing a change request containing one or more application features and system requirements (b) electronically forwarding the change request to a project manager responsible for the computer application;

(c) conducting an impact analysis by comparing one or more application features and system requirements requested in the change request to the existing computer application to determine the degree that the one or more application features and system requirements changes the manner in which the computer application functions, wherein the project manager electronically annotates a first approval status on the change request;

(d) electronically forwarding the change request to a quality assurance lead, if the first approval status is positive, for an analysis of the one or more application features and system requirements requested in the change request in regards to required testing resources including but not limited to funding, manpower, time, and facility utilization, wherein the quality assurance lead annotates a third approval status on the change request;

(e) electronically forwarding the change request to a development lead, if the second approval status is positive, for a cost benefit analysis of the one or more application features and system requirements designated in the change request, wherein the development lead electronically annotates a second approval status on the change request document;

(f) electronically forwarding the change request to a documentation lead, if the third approval status is positive, for an analysis of the one or more application features and system requirements requested in the change request in regards to documentation requirements comprising funding and time wherein the documentation lead annotates a fourth approval status on the change request document;

and (g) incorporating one or more additional sets of computer code into the computer application implementing the one or more application features and system requirements requested in the change request if the fourth approval status on the change request document is positive.

6. The method recited in claim 5, further comprising the steps of:

determining whether there are other technical issues that arise to incorporate the change request in the computer application; and incorporating the change request only if there are no other technical issues.

7. The method recited in claim 5, further comprising the steps of:

resolving any quality assurance issues that arise to incorporate the change request in the computer application; and incorporating the change request after all such quality assurance issues are resolved.

8. The method recited in claim 7, further comprising the steps of:

electronically scheduling a conversation between the project manager and the documentation lead to discuss and resolve all documentation issues that arise to incorporate the change request in the computer application; and incorporating the change request only if there are no such documentation issues or all such documentation issues are favorably resolved.

9. A system for processing change requests to a computer application, said method comprising:

means for receiving an electronic change request message receiving an electronic by a computer containing a change request containing one or more application features and system requirements;

means for electronically forwarding the change request to a project manager responsible for the computer application;

means for electronically annotating a first approval from the project manager to incorporate the change request after conducting an impact analysis by comparing one or more application features and system requirements requested in the change request to the existing computer application;

means for electronically forwarding the change request to a documentation lead, if the first approval means is positive, for an analysis of the one or more application features and system requirements requested in the change request in regards to documentation requirements comprising funding and time wherein the documentation lead annotates a second approval status on the change request document;

means for electronically forwarding the change request to a development lead, if the second approval status is positive, for a cost benefit analysis of the one or more application features and system requirements designated in the change request, wherein the development lead electronically annotates a third approval status on the change request document;

means for electronically forwarding the change request to a quality assurance lead, if the third approval status is positive, for an analysis of the one or more application features and system requirements requested in the change request in regards to required testing resources including but not limited to funding, manpower, time, and facility utilization, wherein the quality assurance lead annotates a fourth approval status on the change request; and means for incorporating one or more additional sets of computer code into the computer application implementing the one or more application features and system requirements requested in the change request if the fourth approval status on the change request document is positive.

10. The system recited in claim 9, further comprising:

means for determining whether there are other technical issues that arise to incorporate the change request in the computer application; and means for incorporating the change request only if there are no other technical issues.

11. The system recited in claim 9, further comprising:

means for resolving any quality assurance issues that arise to incorporate the change request in the computer application; and means for incorporating the change request after all such quality assurance issues are resolved.

12. The system recited in claim 11, further comprising:

means for scheduling a conversation between the project manager and the documentation lead to discuss and resolve all documentation issues that arise to incorporate the change request in the computer application; and means for incorporating the change request only if there are no such documentation issues or all such documentation issues are favorably resolved.

13. A method for processing change requests to a computer application, comprising the steps of:

(a) receiving the change request by electronic message;

(b) performing an impact analysis on the change request and electronically annotating a first approval status on the change request;

(c) performing a technical analysis on the change request if the first approval status is positive and electronically annotating a second approval status on the change request;

(d) performing a quality assurance analysis on the change request if the second approval status is positive and electronically annotating a third approval status on the change request;

(e) performing a documentation analysis on the change request if the third approval status is positive and electronically annotating a fourth approval status on the change request; and determining from the documentation analysis whether there are documentation issues to resolve;

incorporating the change request into the computer application by altering one or more sets of computer code if all documentation issues can be resolved; and holding the change request for further analysis if there are any documentation issues that cannot be resolved.

14. A system for processing change requests to a computer application, comprising:

means for receiving the change request by electronic message;

means for performing an impact analysis on the change request and electronically annotating a first approval status on the change request;

means for performing a technical analysis on the change request if the first approval status is positive and electronically annotating a second approval status on the change request;

means for performing a quality assurance analysis on the change request if the second approval status is positive and electronically annotating a third approval status on the change request;

means for performing a documentation analysis on the change request if the third approval status is positive and electronically annotating a fourth approval status on the change request; and means for determining from the documentation analysis whether there are documentation issues to resolve;

means for incorporating the change request into the computer application by altering one or more sets of computer code if all documentation issues can be resolved; and means for holding the change request for further analysis if there are any documentation issues that cannot be resolved.

\* \* \* \* \*